(12) United States Patent
Jang et al.

(10) Patent No.: US 8,437,317 B2
(45) Date of Patent: May 7, 2013

(54) DATA COMMUNICATION METHOD BASED ON MULTI-RECEIVER AGGREGATION

(75) Inventors: Kyung-Hun Jang, Suwon-si (KR); Jong-Ae Park, Yongin-si (KR); Dong-Jun Lee, Seoul (KR); Jin-Bong Chang, Daejeon (KR); Young-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1013 days.

(21) Appl. No.: 11/222,602

(22) Filed: Sep. 9, 2005

(65) Prior Publication Data

US 2006/0056362 A1 Mar. 16, 2006

Related U.S. Application Data

(60) Provisional application No. 60/609,150, filed on Sep. 10, 2004.

(30) Foreign Application Priority Data

Jan. 4, 2005 (KR) .......................... 10-2005-0000576

(51) Int. Cl.
*H04J 3/00* (2006.01)

(52) U.S. Cl.
USPC .......................................................... 370/336

(58) Field of Classification Search .................. None
See application file for complete search history.

(56) References Cited

U.S. PATENT DOCUMENTS

| | | | | |
|---|---|---|---|---|
| 5,072,447 A | * | 12/1991 | Perloff et al. | 714/712 |
| 5,572,531 A | * | 11/1996 | Nitta et al. | 370/537 |
| 5,818,826 A | | 10/1998 | Gfeller et al. | |
| 2003/0169769 A1 | | 9/2003 | Ho et al. | |
| 2008/0049654 A1 | * | 2/2008 | Otal et al. | 370/311 |

FOREIGN PATENT DOCUMENTS

| | | |
|---|---|---|
| EP | 1 548 990 A1 | 6/2005 |
| KR | 10-1998-0007267 | 3/1998 |
| KR | 10-2000-0015682 | 3/2000 |
| WO | WO 03/088604 A1 | 10/2003 |
| WO | WO 2004/039011 A2 | 5/2004 |
| WO | WO 2005/112355 A1 | 11/2005 |

OTHER PUBLICATIONS

European Search Report issued on Jan. 2, 2012, in corresponding European Application No. 05019680.7 (12 pages).
Wu, Jean-Lien C. et al. "An Adaptive Multirate IEEE 802.11 Wireless LAN." Information Networking, 2001. Proceedings, 15th International Conference on Jan. 31-Feb. 2, Piscataway, NJ, USA, IEEE. (8 pages).
Korean Search/Examination Report issued on Mar. 27, 2006, in corresponding Korean Application No. 10-2005-0000576 (2 pages).

* cited by examiner

*Primary Examiner* — Wayne Cai
*Assistant Examiner* — Shantell L Heiber
(74) *Attorney, Agent, or Firm* — NSIP Law

(57) ABSTRACT

A wireless communication system including transmitters for determining a transmission rate for an associated receiver according to channel state information fed back from associated receivers, and transmitting packets at the determined transmission rate. In a communication method, a transmitter groups packets to be transmitted to the receivers according to transmission rates, and generates frames configured by packets with an identical transmission rate. The transmitter aggregates frames with different transmission rates into one transmission burst, and sends the transmission burst. The data communication method based on packet aggregation can efficiently manage resources by determining transmission rates for reception stations (STAs) on the basis of feedback channel state information in a transmission STA, aggregating packets to be transmitted to the reception STAs to form a packet group, and transmitting packet groups with different transmission rates using one multi-rate aggregation (MRA) burst.

21 Claims, 5 Drawing Sheets

US 8,437,317 B2

DATA COMMUNICATION METHOD BASED ON MULTI-RECEIVER AGGREGATION

PRIORITY

This application claims priority under 35 U.S.C. §119 to an application entitled "Data Communication Method Based on Multi-Receiver Aggregation" filed in the United States Patent and Trademark Office on Sep. 10, 2004 and assigned Ser. No. 60/609,150, and to an application entitled "Data Communication Method Based On Multi-Receiver Aggregation" filed in the Korean Intellectual Property Office on Jan. 4, 2005 and assigned Ser. No. 2005-576, the contents of both of which are incorporated herein by reference.

BACKGROUND OF THE INVENTION

1. Field of the Invention

The present invention relates to wireless communication systems, and more particularly relates to a data communication method based on packet aggregation that can improve transmission efficiency and minimize power loss in a wireless communication system based on multiple carriers.

2. Description of the Related Art

Conventional communication systems use a hierarchical frame structure to efficiently transmit high layer data. Specifically, packet aggregation in a media access control (MAC) layer and a physical layer (PHY) is being studied and developed to maximize the efficiency of radio resources of communication systems which conform to wireless communication standards such as the Institute of Electrical & Electronic Engineers (IEEE) 802.11 and 802.16 standards.

Aggregation schemes include single receiver aggregation (SRA) for aggregating packets destined for a single station (STA) to transmit the aggregated packets in one physical layer (PHY) protocol data unit (PPDU), and multi-receiver aggregation (MRA) for aggregating packets destined for multiple STAs to transmit the aggregated packets in one PPDU.

MRA schemes are classified into an MRA scheme based on a single transmission rate for applying the same transmission rate to packets to be transmitted to different destinations using a single PPDU and an MRA scheme based on multiple transmission rates for applying a transmission rate suitable for packets according to each destination within the PPDU.

A packet aggregation scheme includes an MRA scheme based on a single transmission rate proposed by the task group N synchronization (TGnSync) and a high throughput (HT)-burst scheme proposed by the World Wide Spectrum Efficiency (WWiSE) group as two representative schemes proposed by the IEEE 802.11 TGn standard.

FIG. 1 illustrates the format of an MRA proposed by the TGnSync group. The MRA includes an MRA descriptor MAC protocol data unit (MRAD MPDU) 101 including receiver addresses (RAs), and a plurality of STA-by-STA MPDU groups 103, 105, and 107 each including an initiator aggregate control (IAC) MPDU 102 and data MPDUs 104 to be transmitted to the RAs. The MPDUs 104 are identified by MPDU delimiters (MDs) 109.

The MRAD MPDU 101 includes the RAs of MPDUs included in the MRA. Because a reception STA can determine, in advance (i.e., before reception), if a packet to be received is present in a PPDU, a reduction in reception power can be achieved. However, this MRA scheme is based on the single transmission rate, and must use the lowest transmission rate because all reception STAs must be able to receive the MRA, despite that an optimal transmission rate is available according to the distance between reception STAs or channel characteristics. Therefore, the efficiency of transmission resources is reduced.

FIG. 2 illustrates the format of conventional high throughput HT-burst proposed by the WWiSE group. In FIG. 2, the HT-burst includes PPDUs or aggregation PPDUs (A-PPDUs) configured by frames on an STA-by-STA basis. In other words, a first PPDU 201 includes Frame #0 210 and Frame #1 211 whose destinations are STA #1), a second PPDU 202 includes Frame #2 212, a third PPDU 203 includes Frame #3 213 and a fourth PPDU 204 includes Frame #4 214 and Frame #5 215.

When successive frames are transmitted at the same power in the conventional HT-burst scheme, the next frame is transmitted on the basis of zero interframe space (ZIFS). When successive frames are transmitted at different power in the HT-burst scheme, the next frame is transmitted on the basis of reduced interframe space (RIFS). Here, the transmission power variation indicates the transmission rate variation. The conventional HT-burst scheme does not take into account reception power reduction and has only an STA-by-STA aggregation effect. As an A-PPDU transmission interval is reduced, a small benefit may be expected. However, a multi-STA aggregation effect is, for the most part, insignificant, in the conventional HT-burst scheme.

SUMMARY OF THE INVENTION

Accordingly, the present invention has been designed to solve the above and other problems occurring in the prior art. Therefore, it is an aspect of the present invention to provide a data communication method based on packet aggregation that can efficiently manage resources by determining transmission rates for reception stations (STAs) on the basis of channel state information received therefrom, aggregating packets with the same transmission rate to be transmitted to the reception STAs to form a packet group, and transmitting packet groups with different transmission rates using a single multi-rate aggregation (MRA) burst.

It is another aspect of the present invention to provide a data communication method based on packet aggregation that can minimize power consumption required for reception as one or more reception stations (STAs) initiate a reception only mode in a packet group interval including the STAs packets to be received using control information included in a multi-rate aggregation (MRA) burst.

The above and other aspects of the present invention can be achieved by a communication method in a wireless communication system having transmitters for determining a transmission rate for an associated receiver according to channel state information fed back from associated receivers, and transmitting packets at the determined transmission rate, including grouping packets to be transmitted to the receivers according to transmission rates and generating frames with an identical transmission rate in a transmitter aggregating frames with different transmission rates into a single transmission burst and transmitting the single transmission burst, the transmission burst including a control information frame.

The above and other aspects of the present invention can also be achieved by a data transmission method in a wireless communication system having transmitters for determining a transmission rate for an associated receiver according to channel state information fed-back from associated receivers, and transmitting packets at the determined transmission rate, including grouping media access control (MAC) protocol data units (MPDUs) to be transmitted to the receivers according to transmission rates and generating aggregation physical layer (PHY) protocol data units (A-PPDUs) configured by MPDUs with an identical transmission rate and aggregating A-PPDUs with different transmission rates into a single multi-rate aggregation (MRA) burst and transmitting the MRA burst.

The above and other aspects of the present invention can also be achieved by a data reception method in a wireless communication system having transmitters for determining a transmission rate for an associated receiver according to channel state information fed back from associated receivers, and transmitting packets at the determined transmission rate, including when a multi-rate aggregation (MRA) burst descriptor (BD) physical layer (PHY) protocol data unit (PPDU) is received from a transmitter, determining if a receiver's own address is present in the MRA BD PPDU; if the receiver's own address is present, referring to a receiver address (RA) field of the MRA BD PPDU and identifying an aggregation PPDU (A-PPDU) to be received from transmitted A-PPDUs subsequent to the MRA BD PPDU; when the A-PPDU begins to be received, determining if the A-PPDU is an A-PPDU transmitted for the receiver using a preamble and a header of the A-PPDU; if the A-PPDU is an A-PPDU transmitted for the receiver, receiving a total of the A-PPDU; and extracting media access control (MAC) protocol data units (MPDUs) transmitted for the receiver from the received A-PPDU.

The data reception method further including reading a header of the A-PPDU and entering sleep mode until a next A-PPDU begins to be received, if the A-PPDU is not an A-PPDU transmitted for the receiver.

The data reception method further including referring to an MRA burst duration field of the MRA BD PPDU, when the receiver's own address is not present in the MRA BD PPDU, terminating reception mode in a duration of the MRA burst, and entering an off mode.

BRIEF DESCRIPTION OF THE DRAWINGS

The above and other aspects and advantages of the present invention will be more clearly understood from the following detailed description taken in conjunction with the accompanying drawings, in which.

DETAILED DESCRIPTION OF THE PREFERRED EMBODIMENTS

A packet aggregation method according to an embodiment of the present invention will now be described in detail with reference to the accompanying drawings.

Figure 1:
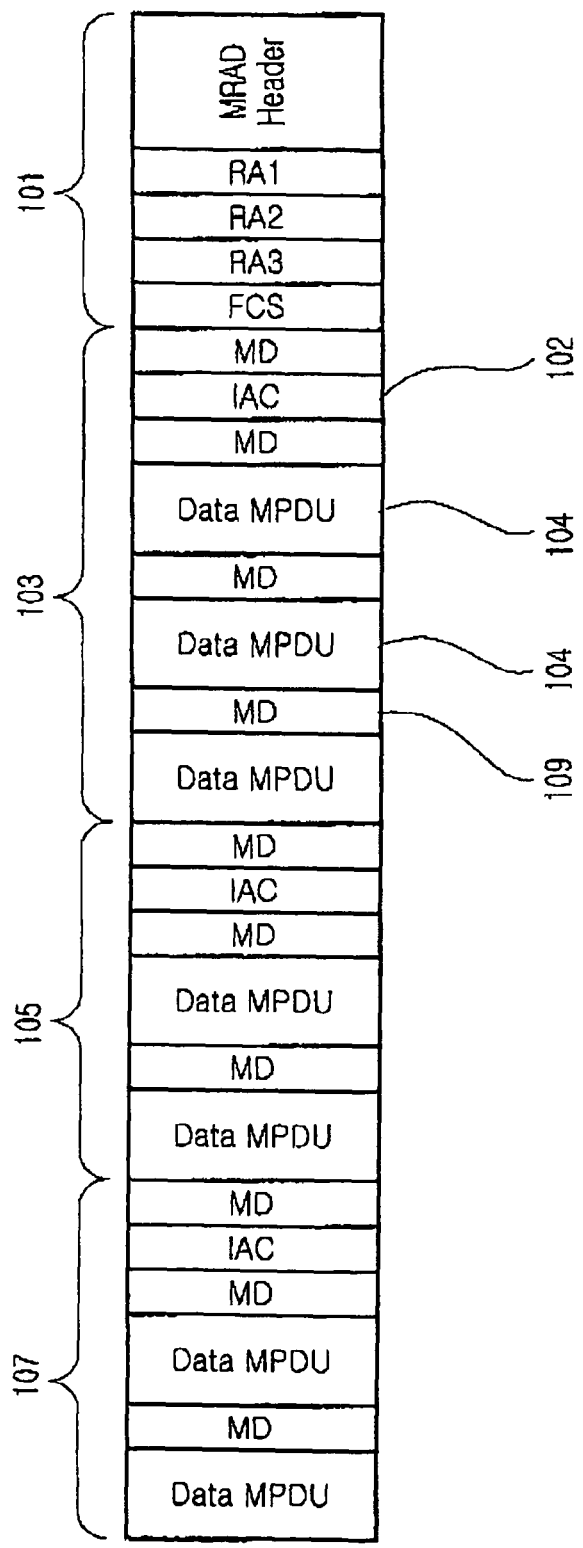
FIG. 1 is a diagram illustrating a conventional packet aggregation method.
Figure 2:
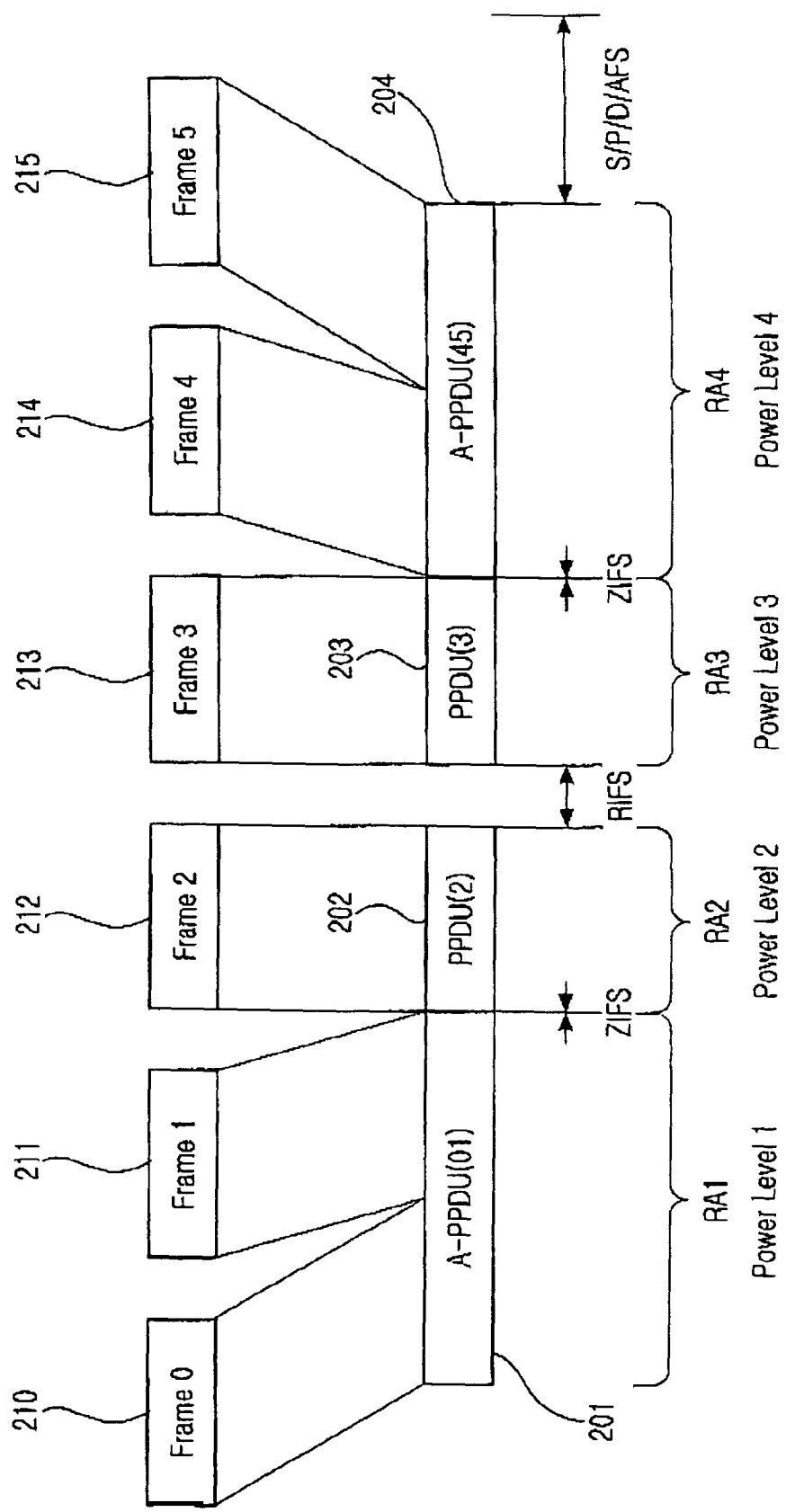
FIG. 2 is a diagram illustrating another conventional packet aggregation method.
Figure 3:
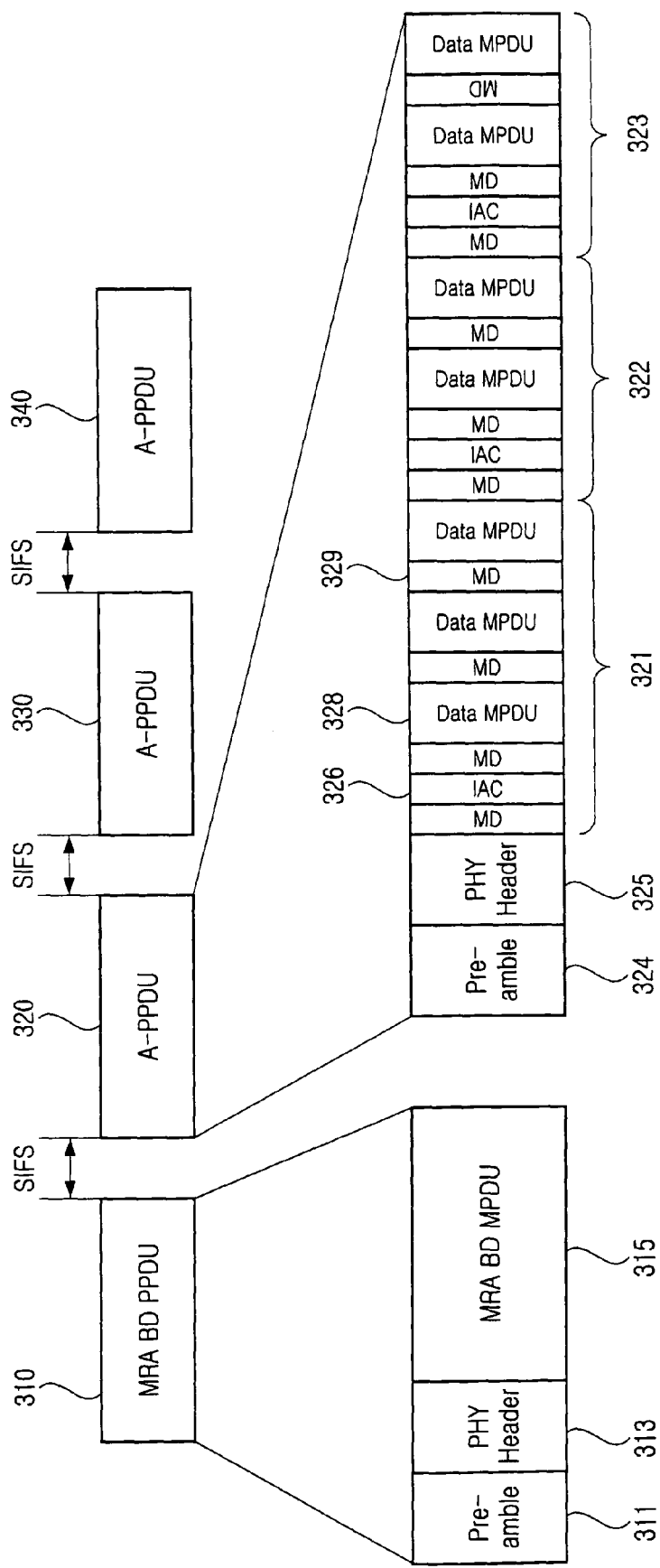
FIG. 3 is a diagram illustrating an example of a packet aggregation communication method according to an embodiment of the present invention.

FIG. 3 is a diagram illustrating an example of a packet aggregation communication method in accordance with an embodiment of the present invention.

A multi-rate aggregation (MRA) burst in accordance with an embodiment of the present invention includes an MRA burst descriptor (BD) PHY protocol data unit (PPDU) 310 and three subsequent aggregation PPDUs (A-PPDUs) 320, 330, and 340. The MRA BD PPDU 310 is configured by a preamble 311, a PHY header 313, and an MRA BD MAC protocol data unit (MPDU) 315, and is broadcast at a basic transmission rate.

Before an MRA BD PPDU is transmitted, a transmission station (STA) groups reception STAs according to transmission rates according to a channel state of each reception STA. Then, the transmission STA aggregates packets to be sent to addresses of reception STAs belonging to each group into an MRA PPDU based on a single transmission rate, and configures an A-PPDU.

FIG. 3 illustrates a case where transmission rates for STAs with receiver addresses RA1, RA2 and RA3 are set to 1, transmission rates for STAs with receiver addresses RA4, RA5, and RA6 are set to 2, and transmission rates for STAs with receiver addresses RA7 and RA8 are set to 3, according to channel state information fed back from the reception STAs.

As illustrated in FIG. 3, an MPDU group 321 to be sent to RA1, an MPDU group 322 to be sent to RA2, and an MPDU group 323 to be sent to RA3 associated with the transmission rate of 1 are aggregated into a first A-PPDU 320. Similarly, MPDU groups to be sent to RA4, RA5, and RA6 associated with the transmission rate of 2 are aggregated into a second A-PPDU 330. Similarly, MPDU groups to be sent to RA7 and RA8 associated with the transmission rate of 3 are aggregated into a third A-PPDU 340. Each A-PPDU is generated by inserting a preamble 324 and a physical layer (PHY) header 325 before an MPDU group.

Each MPDU group includes a control MPDU 326 and data MPDUs 328. The MPDUs are delimited by MPDU delimiters 329. A time interval between A-PPDUs uses short interframe space (SIFS) for high-priority media access.

Three A-PPDUs and three MPDU groups have been illustrated in this embodiment. However, the number of A-PPDUs or MPDU groups configuring the MRA burst is not limited to three, but can be changed according to a communication environment.

Figure 4:
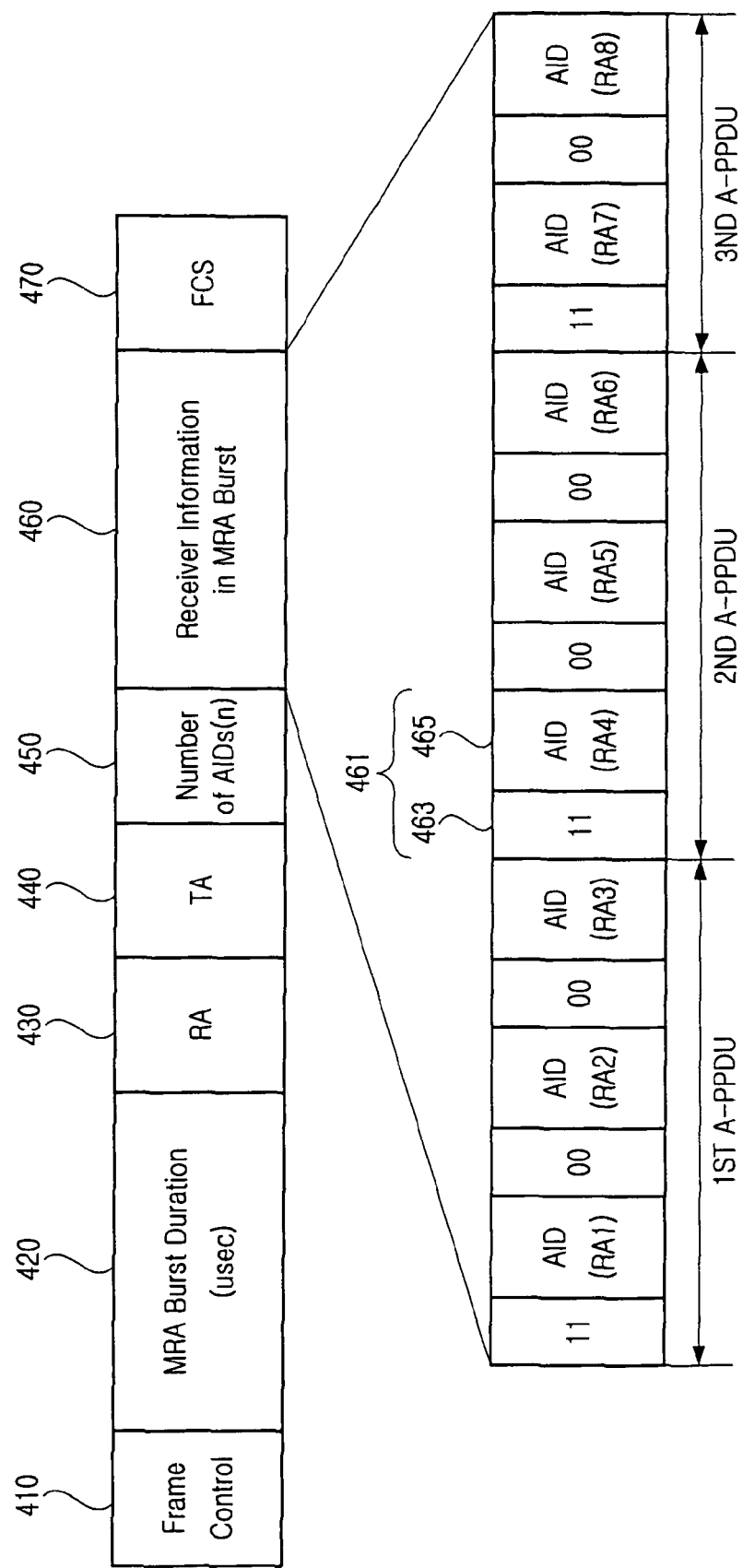
FIG. 4 is a diagram illustrating a structure of a multi-rate aggregation (MRA) burst descriptor (BD) MAC protocol data unit (MPDU) of FIG. 3.

FIG. 4 is a diagram illustrating a structure of the MRA BD MPDU of FIG. 3. The MRA BD MPDU 315 includes a 2-octet frame control field 410 indicating a frame type, a 2-octet MRA burst duration field 420, a 6-octet receiver address (RA) field 430, a 6-octet transmitter address (TA) field 440, a 1-octet "number of association ID (AID) (n)" field 450, a 2n-octet receiver information field 460 in the MRA burst, and a 4-octet frame check sequence (FCS) field 470.

A value of the MRA burst duration field 420 can be used to prevent contention for time-consuming media access of legacy STAs. The receiver information field 460 in the MRA burst includes a plurality of 2-octet AID elements 461. Each AID element 461 includes a 2-bit delimiter 463 and an AID 465. The delimiter 463 can have a value of "11" or "00" (binary). If the delimiter 463 has a value of "11" delimiter 463 indicates that an AID is included in the next A-PPDU, and the value "00" of the delimiter 463 indicates that an AID included in the A-PPDU is the same as an AID of an immediately proceeding PPDU.

A reception method of a reception STA using the above-described MRA burst structure will be described with reference to the accompanying drawings.

First, when an STA receives an MRA BD PPDU 310, it determines if an AID element including the STA's unique AID is present among AID elements enumerated in the receiver information field 460 within the MRA BD MPDU 315 of the MRA BD PPDU 310.

If it is determined that the STA's unique AID is included the STA determines which of the A-PPDUs 320, 330 and 340, which are transmitted subsequent to the MRA BD PPDU 310), includes the STA's MPDUs to be received, using values of delimiters 463 of AID elements 461.

Continuously, when A-PPDUs are received, the STA refers to an A-PPDU preamble 324 and a PHY header 325, and determines if a received A-PPDU includes an MPDU transmitted for the STA. If the received A-PPDU includes an MPDU transmitted for the STA, the STA receives an associated A-PPDU and detects MPDUs.

However, if the A-PPDU does not include an MPDU transmitted for the STA, the STA reads a PHY header and enters sleep mode until the start of the next A-PPDU.

On the other hand, the receiving STA turns off reception power during a time interval indicated by the MRA burst duration field 420 if the STA's AID is not included in the MRA BD PPDU 310.

In case of a legacy STA that cannot detect an MRA burst, reception power can be turned off using a long network allocation vector (NAV) function (or a function for limiting transmission used in the IEEE 802.11 standard) according to a value of the MRA burst duration field 420.

Figure 5:
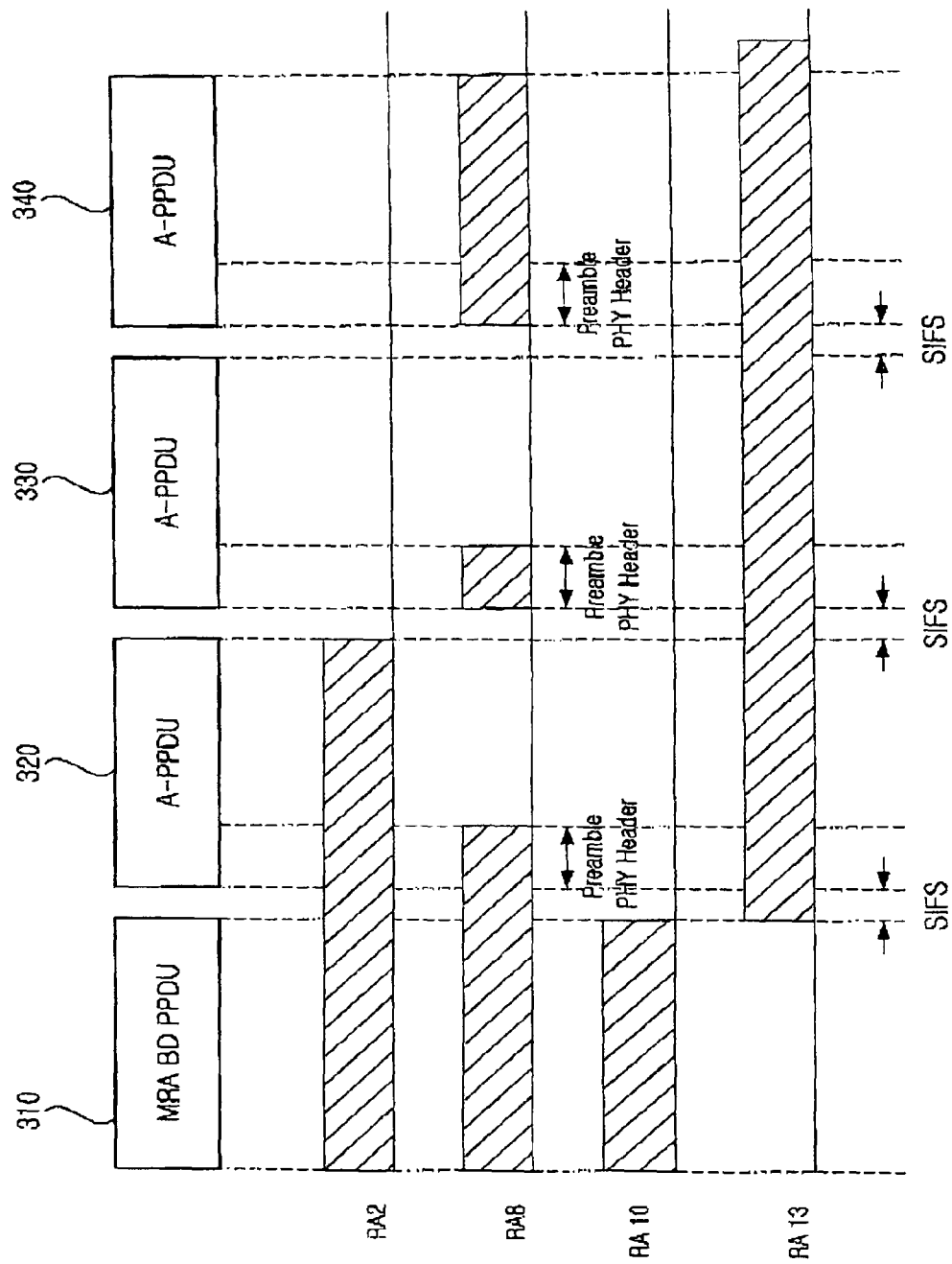
FIG. 5 is a diagram illustrating the effect of reducing reception power of a station (STA) in a packet aggregation communication method according to an embodiment of the present invention.

FIG. 5 illustrates the effect of reducing reception power of an STA in a packet aggregation communication method in accordance with an embodiment of the present invention.

Referring to FIGS. 3 to 5, for example, an STA with a receiver address of RA2 determines that its own MPDUs to be received are included in the first A-PPDU 320 using delimiter values of AID elements included in the MRA BD PPDU 310, receives the first A-PPDU 320, detects its own MPDUs, and thereafter enters a sleep mode.

On the other hand, an STA with a receiver address of RA8 determines that its own MPDUs to be received are included in the third A-PPDU 340 using delimiter values of AID elements included in the MRA BD PPDU 310. At the start of reception of the first A-PPDU 320, the STA refers to a preamble and a PHY header of the first A-PPDU, determines that the first A-PPDU is not an A-PPDU transmitted for the STA, and enters the sleep mode until the next A-PPDU arrives. When the first A-PPDU 320 ends, the STA enters reception mode and begins to receive a second A-PPDU 330. At the start of reception of the second A-PPDU 330, the STA refers to a preamble and a PHY header of the second A-PPDU 330, determines that the second A-PPDU 330 is not an A-PPDU transmitted for the STA, and enters the sleep mode until the next A-PPDU arrives. At the start of reception of the third A-PPDU 340, the STA refers to a preamble and a PHY header of the third A-PPDU 340, determines that the third A-PPDU 340 is an A-PPDU transmitted for the STA, and receives the third A-PPDU 340 in its entirety.

Upon receiving an MRA BD PPDU (in its entirety), a third-party high throughput (HT) STA with a receiver address of RA10 enters the sleep mode. As soon as an interval of an MRA BD PPDU ends, a legacy STA with a receiver address of RA13 performs a long NAV function.

The STA with the receiver address of RA2 and the STA with the receiver address of RA8 enter the reception mode during a time interval in which they receive respective A-PPDUs transmitted to them, and enters the sleep mode during other A-PPDU intervals, such that the consumption of reception power is minimized.

In accordance with the present invention as described above, a data communication method based on packet aggregation can efficiently manage resources by determining transmission rates for reception stations (STAs) on the basis of feedback channel state information in a transmission STA, aggregating packets with the same transmission rate to be transmitted to the reception STAs to form a packet group, and transmitting packet groups with different transmission rates using a single multi-rate aggregation (MRA) burst.

In accordance with the present invention, the data communication method based on packet aggregation can minimize the consumption of reception power as reception STAs enter a reception mode only during a packet group interval including their own packets to be received, using control information included in a multi-rate aggregation (MRA) burst.

Although preferred embodiments of the present invention have been disclosed for illustrative purposes, those skilled in the art will appreciate that various modifications, additions, and substitutions are possible, without departing from the scope of the present invention. Therefore, the present invention is not limited to the above-described embodiments, but is defined by the following claims, along with their full scope of equivalents.

What is claimed is:

1. A communication method in a wireless communication system having transmitters for determining a transmission rate for an associated receiver of a plurality of receivers according to channel state information fed back from one or more of the associated receivers, and transmitting packets at the determined transmission rate, the method comprising:

grouping packets to be transmitted to the receivers according to transmission rates;

generating a frame having a plurality of sub-frames, each sub-frame including one or more packets having an identical transmission rate, in a transmitter;

aggregating sub-frames having packets with different transmission rates into one transmission burst;

providing a first delimiter to delimit each of the packets in each of the aggregated sub-frames;

providing a control information frame for the transmission burst including a receiver information field having identifiers of each receiver associated with a packet in one of the aggregated frames;

separating each receiver identifier in the receiver information field with a second delimiter capable of having two different values to indicate association of each receiver identifier with a sub-frame, wherein a first value for the second delimiter indicates a receiver identifier is in a next sub-frame and a second value for the second delimiter indicates a receiver identifier is included in a same sub-frame as a preceding receiver identifier; and transmitting the transmission burst.

2. The communication method of claim 1, wherein the sub-frames include packet groups generated by aggregating packets to be transmitted on a receiver-by-receiver basis.

3. The communication method of claim 2, wherein each packet group comprises a control information packet and data packets.

4. The communication method of claim 1, wherein the control information frame is located at a beginning of the transmission burst and is broadcast using a basic transmission rate.

5. The communication method of claim 1, wherein the receiver identifiers include addresses of the receivers.

6. The communication method of claim 5, wherein the receiver identifiers are arranged in the same order as packet groups included in the frames.

7. The communication method of claim 1, wherein a value of the second delimiter is set to 11 (binary) for the first value and is set to 00 for the second value.

8. The communication method of claim 7, further comprising:
   checking the receiver information field of the control information frame and determining if the receiver's address is present, when the receiver receives the control information frame;
   identifying a frame comprising packets transmitted for the receiver using values of the receiver address elements based on the second delimiter value, if the receiver's address is present;
   determining if a frame transmitted for the receiver is present using preambles and headers of received frames subsequent to the control information frame;
   receiving an associated frame, if a frame transmitted for the receiver is present; and
   extracting packets transmitted for the receiver from the received frame.

9. The communication method of claim 8, further comprising:
   reading, by the receiver, a header of the frame and entering sleep mode until a next frame begins if a frame transmitted for the receiver is not present.

10. The communication method of claim 9, further comprising:
    referring to a transmission burst duration field of the control information frame and terminating a reception mode for a duration of the transmission burst, if the receiver's address is not present in the receiver information field.

11. A data transmission method in a wireless communication system having transmitters for determining a transmission rate for an associated receiver according to channel state information fed back from associated receivers, and transmitting packets at the determined transmission rate, the method comprising:
    grouping media access control (MAC) protocol data units (MPDUs) to be transmitted to the receivers according to transmission rates and generating aggregation physical layer (PHY) protocol data units (A-PPDUs) including MPDUs having an identical transmission rate; and
    aggregating A-PPDUs with different transmission rates into one multi-rate aggregation (MRA) burst;
    providing a first delimiter to delimit each of MPDUs in each of the A-PPDUs;
    providing an MRA burst descriptor (BD) PPDU including a receiver information field having identifiers of each receiver receiving a packet in one of the A-PPDUs;
    separating each receiver identifier in the receiver information field with a second delimiter capable of having two different values to indicate association of each receiver identifier with an A-PPDU, wherein a first value for the second delimiter indicates a receiver identifier is included in a next A-PPDU and a second value for the second delimiter indicates a receiver identifier is included in a same A-PPDU as a preceding receiver identifier; and
    sending the MRA burst.

12. The data transmission method of claim 11, wherein MPDUs included in each A-PPDU are grouped into a receiver-by-receiver MPDU group and are arranged in a predetermined order.

13. The data transmission method of claim 12, wherein each A-PPDU includes a control MPDU and at least one data MPDU.

14. The data transmission method of claim 11, wherein the MRA BD PPDU includes a frame control field, an MRA burst duration field, a receiver address (RA) field, a transmitter address (TA) field, a 1-octet "number of association ID (AID)" field, a 2n-octet receiver information field in the MRA burst (where n is an integer), and a frame check sequence (FCS) field.

15. The data transmission method of claim 14, wherein the MRA BD PPDU is located at a beginning of the MRA burst and is broadcast using a basic transmission rate.

16. The data transmission method of claim 15, wherein the identifier includes receiver address (RA) elements comprising target RAs to which the MPDUs are transmitted.

17. The data transmission method of claim 16, wherein the RA elements are arranged in the same order as MPDUs included in the MRA burst.

18. The data transmission method of claim 17, wherein a value of the second delimiter is set to 11 (binary) for a first MPDU group of each A-PPDU and is set to 00 for remaining MPDU groups in the A-PPDU.

19. A data reception method in a wireless communication system having transmitters for determining a transmission rate for an associated receiver according to channel state information fed back from associated receivers, and transmitting packets at the determined transmission rate, the method comprising:
    receiving a multi-rate aggregation (MRA) burst including a burst descriptor (BD) physical layer (PHY) protocol data unit (PPDU), a plurality of aggregation PPDUs (A-PPDUs), each A-PPDU associated with a transmission rate, and a first delimiter to delimit each of MPDUs in each of the A-PPDUs;
    referring to a receiver address (RA) field of the MRA BD PPDU where each RA in the RA field is separated by a second delimiter capable of having two different values to indicate association of each receiver identifier with an A-PPDU, wherein a first value for the second delimiter indicates a RA is included in a next A-PPDU and a second value for the second delimiter indicates a RA is included in a same A-PPDU as a preceding RA and identifying an A-PPDU in the burst based on the first or second delimiter value, if the receiver's address is present in the RA field;
    receiving a total of the A-PPDU, if the A-PPDU is an A-PPDU identified as transmitted for the receiver; and
    extracting media access control (MAC) protocol data units (MPDUs) transmitted for the receiver from the received A-PPDU.

20. The data reception method of claim 19, further comprising:
    reading a header of the A-PPDU and entering sleep mode until the start of reception of a next A-PPDU, if the A-PPDU is not an A-PPDU transmitted for the receiver.

21. The data reception method of claim 19, further comprising:
    if it is determined that the receiver's address is not present in the MRA BD PPDU:
       referring to an MRA burst duration field of the MRA BD PPDU;
       terminating reception mode in a duration of the MRA burst; and
       entering an off mode.

* * * * *